S. B. CONOVER.
Potato-Digger.
No. 63,475.
Patented Apr. 2, 1867.
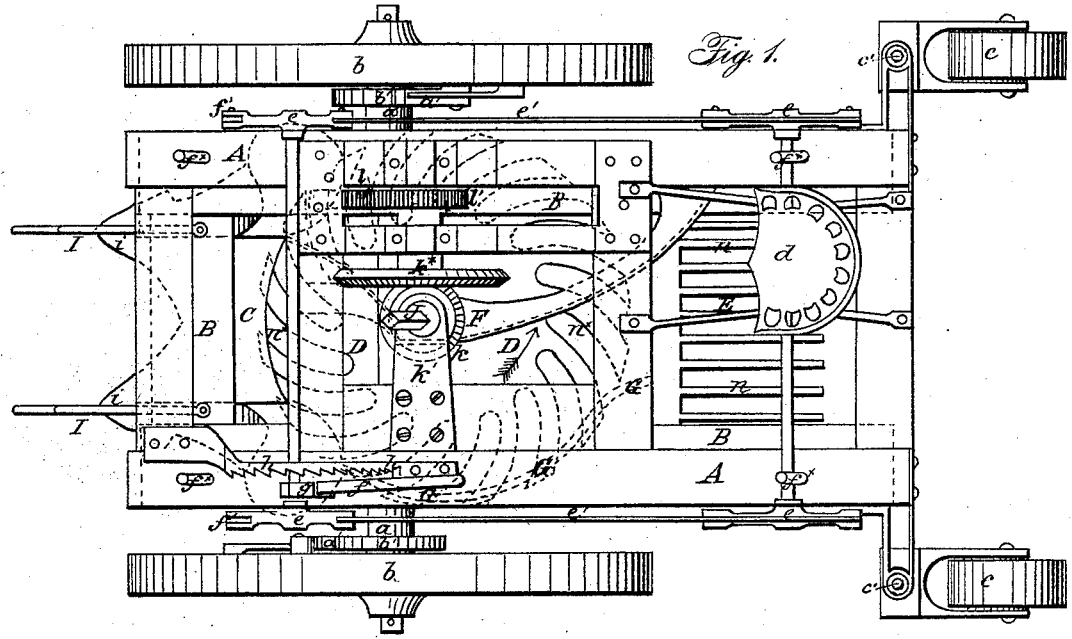
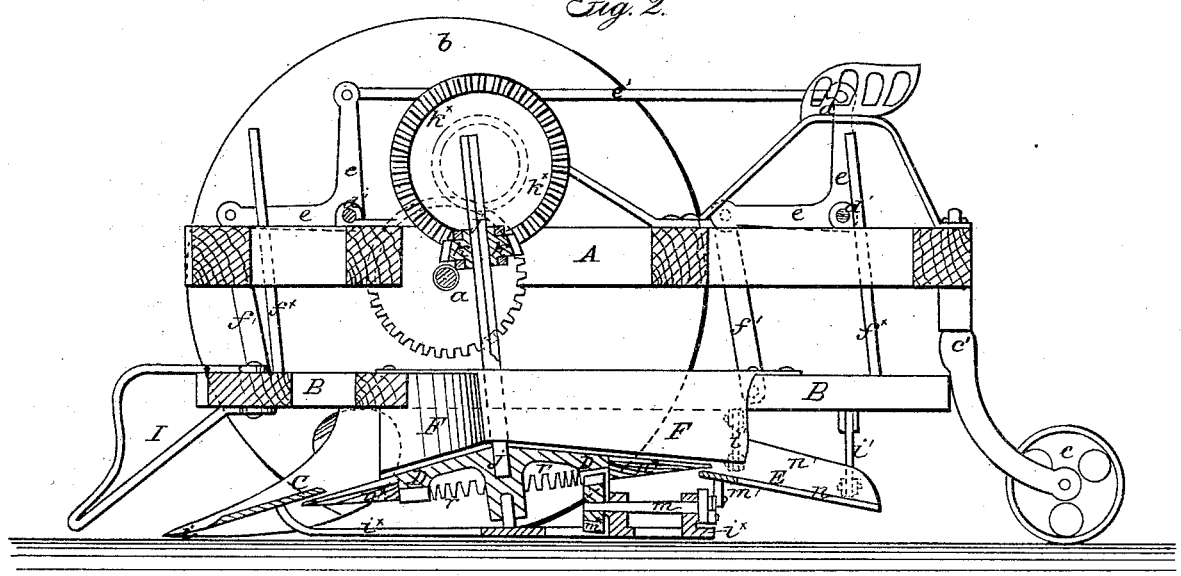
Witnesses:
Inventor:

United States Patent Office.

S. B. CONOVER, OF NEW YORK, N. Y.

Letters Patent No. 63,475, dated April 2, 1867.

---

IMPROVEMENT IN POTATO DIGGERS.

---

The Schedule referred to in these Letters Patent and making part of the same.

---

TO ALL WHOM IT MAY CONCERN:

Be it known that I, S. B. CONOVER, of the city, county, and State of New York, have invented certain new and useful Improvements in Potato Diggers; and I do hereby declare that the following is a full, clear, and exact description of the same, reference being had to the accompanying drawings, making a portion of this specification, in which—

Figure 1 is a plan or top view of a potato digger, constructed according to my invention.

Figure 2 is a central vertical longitudinal section of the same.

Similar letters of reference indicate corresponding parts in both figures.

This invention consists in an inclined carrying-wheel, so combined with the share or shovel-plough of a potato digger as to convey the potatoes back and upward from the aforesaid shovel-plough, preparatory to depositing them upon the surface of the ground in rear of the machine.

The invention further consists in the construction of the aforesaid carrying-wheel, with slots or openings, whereby the dirt or earth may, in a great measure, be sifted from the potatoes previous to their escape from the rearmost side of the said carrying-wheel.

The invention further consists in the combination of suitable guards or fenders with the carrying-wheel, whereby its most efficient operation in conveying the potatoes from the shovel-plough is secured.

The invention further consists in certain novel means, whereby any dirt or earth that may be mingled with the potatoes as they pass from the carrying-wheel is effectually separated therefrom previous to their being deposited upon the ground, whereby the potato tops or vines are caused to pass readily over the shovel-plough to the carrying-wheel, thus preventing them from clogging the aforesaid plough during the operation of the machine, and whereby any disarrangement of the gearing which operates the carrying-wheel, by the raising or lowering of the said wheel, is avoided.

To enable others to understand the construction and operation of my invention, I will proceed to describe it with reference to the drawings.

The machine is constructed with a horizontal main frame, A, the forward end of which is supported by means of a transverse axle, $a$, upon two main or driving-wheels, $b$, which communicate a rotary motion to the aforesaid axle by means of spring-pawls, $a'$, attached to the said wheels, and ratchets, $b'$, secured upon the axle. The rearmost end of the main frame is sustained by two caster-wheels, $c$, which are pivoted in the forked and bent lower ends of vertical arbors, $c'$. The said frame A is furnished with a suitable seat, $d$, for the driver or person using the machine, and has situated transversely upon it, one near each of its ends, two rock-shafts, $d'$, upon each end of each one of which is secured a bell-crank lever, $e$. The uppermost arms of the two bell-crank levers, thus situated at each side of the main frame, are connected by horizontal rods or bars, $e'$, while the lower or nearly horizontal arms of the said levers are connected by nearly vertical rods, $f'$, with a supplemental frame, B, situated underneath the main frame in such manner that when the uppermost arms of the bell-crank levers $e$ are pushed back, the supplemental frame B will be raised up, and *vice versa*. The bell-crank levers are thus operated to raise the frame B by means of an operating lever, $f$, attached to the foremost rock-shaft $d'$, the said operating lever being pivoted in a shell or case, $g$, secured to such rock-shaft in such a way that the lever may be moved inward, by a suitable spring situated within the shell $g$, so that a metallic lip, $h'$, attached to the lever $f$, may catch between the teeth of a fixed semicircular ratchet-bar, $h$, situated upon the main frame A, and thus, by retaining the lever in any desired position, hold the supplemental frame B at any required distance from the ground. The supplemental frame is also connected with the main frame by upwardly projecting braces, $f^*$, which pass up through suitable holes or slots formed in the main frames in such manner as to brace the supplemental frame in position against the backward strain exerted upon it by the action of the shovel-plough, and at the same time permit it to be raised or lowered, as desired. These braces $f^*$ are inclined so as to occupy a position parallel with that of the shaft $j$, hereinafter described. The shovel-plough of the machine is shown at C, and is constructed with two forwardly projecting share points, $i$, and is firmly attached to the forward end of the supplemental frame B in any suitable manner. Extending back from the bottom of this shovel-plough, and with its rear portion connected with the rear part of the supplemental frame B by suitable rods or links, is a horizontal framing or series of braces, $i^*$, which not only serves to strengthen the plough, but also affords a bearing for the lower end of the inclined shaft $j$, which works in a suitable step formed in the said framing. The upper portion of this shaft $j$ is made square, and passes through a square slot formed centrally in a bevel-pinion, $k$, the circular hub of which is fitted into a suitable bearing formed in an arm, $k'$, fixed upon the main frame in such a way as to constitute a support for the aforesaid upper part of the shaft $j$, which is thus left free to move up and down without interfering with the rotary movement of the pinion $k$, the said pinion receiving its motion from a larger bevel-gear, $k^*$, to the shaft of which motion is communicated from the rotating axle $a$ through the agency of intermediate spur-wheels, $l\ l'$. Secured to the shaft $j$, near the lower end thereof, and just behind the shovel-plough, is a carrying-wheel, D, the upper surface of which is made convex, or with its central part higher than its rim, as shown more fully in fig. 2. The shaft $j$ being inclined, as shown in the said figure, the wheel D is of course situated in an inclined position, the upper surface of its forward portion being situated nearly or quite in line with the upper surface of the shovel-plough, while the opposite or rear portion of the wheel is situated considerably higher than the forward part, just mentioned. The carrying-wheel may, if desired, be made solid, or of disk form, with its upper surface of any configuration suitable for carrying the earth and potatoes back from the shovel-plough; but it is much preferred that the circumferential portion thereof should be formed with slots or openings, $n^*$, of such size as to permit the passage of dirt or earth through them, but not large enough to allow the potatoes to fall through. E represents a shaking screen, which is suspended by suitable hangers, $b'$, immediately behind the carrying-wheel D, and with its forward edge extending a little distance under the edge of the said wheel. This screen is formed of longitudinal bars, $n$, attached to suitable cross-bars, and is furnished with side-boards, $n'$, which prevent the potatoes from being thrown laterally from the screen in passing over the same. A vibratory or shaking motion is communicated to this screen by means of a crank-shaft, $m$, and pitman, $m'$, the said crank-shaft being rotated by means of a small bevel-pinion, $m^*$, attached to one end thereof, and gearing into a toothed rim or wheel, $r$, formed upon the under side of the carrying-wheel. Firmly secured upon the supplemental frame is a guard, F, which extends across the carrying-wheel, and is so curved and shaped that while it permits the passage of the mingled dirt and potatoes back from the shovel-plough over and upon that side of the wheel which turns or moves toward the rear end of the machine it effectually prevents it from passing to the opposite side of the said wheel; or, in other words, to that side thereof which moves toward the shovel-plough. Another guard, shown in dotted lines at G in fig. 1, is placed at one edge of the supplemental frame, and extending around a portion of the rearwardly moving side of the carrying-wheel, in such manner as to prevent the potatoes from being thrown laterally from the said portion of the wheel during the operation of the machine. Projecting forward from the supplemental frame, over and beyond the share points of the shovel-plough, are two deflecting arms, I, which may be formed of metal rods bent into proper shape, and the office of which is to turn or deflect inward the potato tops or vines so that they will pass over the central part of the shovel-plough to the carrying-wheel without clogging the action of the machine. The machine being drawn along by horses or other draught animals, attached to a suitable draught-pole connected with the forward end of the main frame, the shovel-plough passes through the "rows" of potato hills at a suitable depth below the surface of the ground, the potato tops or vines being so guided or deflected inward by the deflecting arms I as to pass upward and back upon the central part of the aforesaid plough, being thus prevented from clogging the same. The mingled earth and potatoes, passing upward over the inclined surface of the shovel as the machine are thus drawn forward, pass back from the said plough and fall upon the carrying-wheel D, and are carried thereby back between the guards F G to the shaking screen E, from the rearmost end of which the potatoes fall to the ground, the greater portion of the dirt, mingled with the potatoes as they pass from the shovel-plough, being shaken through the slots or openings $n^*$ of the carrying-wheel, and what remains mixed with them, after passing to the shaking screen, being effectually shaken therefrom through the spaces between the bars $n$ of the said screen. Inasmuch as the braces $f^*$ are placed in an inclined position corresponding to that of the shaft $j$, it follows that when the supplemental frame is raised or lowered, as hereinbefore explained, the shaft $j$ is enabled to move freely up or down, as the case may be, through the slot in the pinion $k$, so that by this means the operation of raising or lowering the aforesaid supplemental frame is prevented from interfering in any way with the proper rotation or operation of the carrying-wheel D.

The supplemental frame B, with its rods, levers, and other operating parts, being the subject of another application of mine of even date with this, is not claimed herein.

What I claim as my invention, and desire to secure by Letters Patent, is—

1. The combination of the carrying-wheel D with the shovel-plough C, each constructed substantially as herein set forth, for the purpose specified.

2. The construction of the carrying-wheel D with curved slots or openings $n^*$, substantially as herein set forth, for the purpose specified.

3. The combination of the guards or fenders F G with the carrying-wheel D, substantially as herein set forth, for the purpose specified.

4. The shaking screen E, arranged in relation with the carrying-wheel D and shovel-plough C, substantially as herein set forth, for the purpose specified.

5. The arrangement of the deflecting arms I, in relation with the shovel-plough C and carrying-wheel D, substantially as herein set forth, for the purpose specified.

S. B. CONOVER.

Witnesses:
  J. W. COOMBS,
  G. W. REED.